United States Patent
Satyanarayana et al.

(10) Patent No.: US 11,936,282 B2
(45) Date of Patent: Mar. 19, 2024

(54) SYSTEM AND METHOD FOR IMPROVING EFFICIENCY IN MULTIPORT USB BASED POWER ADAPTERS

(71) Applicant: SILICONCH SYSTEMS PVT LTD, Karnataka (IN)

(72) Inventors: Burle Naga Satyanarayana, Andhra Pradesh (IN); Shubham Kumar Paliwal, Uttar Pradesh (IN); Rakesh Kumar Polasa, Karnataka (IN)

(73) Assignee: SILICONCH SYSTEMS PVT LTD, Karnataka (IN)

( * ) Notice: Subject to any disclaimer, the term of this patent is extended or adjusted under 35 U.S.C. 154(b) by 15 days.

(21) Appl. No.: 17/700,399

(22) Filed: Mar. 21, 2022

(65) Prior Publication Data

US 2022/0416642 A1    Dec. 29, 2022

(30) Foreign Application Priority Data

Jun. 24, 2021 (IN) .............................. 202141028407

(51) Int. Cl.
H02M 1/00 (2006.01)

(52) U.S. Cl.
CPC ........... *H02M 1/009* (2021.05); *H02M 1/007* (2021.05)

(58) Field of Classification Search
CPC .............................. H02M 1/007; H02M 1/009
See application file for complete search history.

(56) References Cited

U.S. PATENT DOCUMENTS

| | | | |
|---|---|---|---|
| 2015/0155787 A1* | 6/2015 | Chen | H02M 3/33523 363/21.15 |
| 2018/0287491 A1* | 10/2018 | Muto | G06F 1/3206 |
| 2021/0111578 A1* | 4/2021 | Ou | G06F 1/266 |
| 2022/0285955 A1* | 9/2022 | Koo | H02M 3/33523 |
| 2022/0350388 A1* | 11/2022 | Lin | G06F 1/266 |

OTHER PUBLICATIONS

Universal Serial Bus Type-C Cable and Connector Specification Release 2.0, USB 3.0 Promoter Group, Aug. 2019 (373 pages).
Universal Serial Bus Power Delivery Specification, Revision 3.0, Version 2.0, Aug. 29, 2019 (657 pages).

* cited by examiner

*Primary Examiner* — Harry R Behm
(74) *Attorney, Agent, or Firm* — Procopio, Cory, Hargreaves & Savitch LLP

(57) ABSTRACT

The present disclosure relates to an apparatus for adjusting AC-DC converter output voltage, the apparatus includes a plurality of ports, an AC-DC converter circuit, a plurality of DC-DC converters coupled to a plurality of controllers, where the plurality of controllers coupled to corresponding plurality of ports to operate the one or more loads, wherein at least one controller is a master controller and the other plurality of controllers are slave controllers. The master controller configured to determine, from the slave controllers power levels for each port, calculate an optimal input voltage value for the DC-DC converters and communicate the calculated value to the AC-DC converter circuit through a constant current source to regulate the amount of DC voltage that is being supplied to the DC-DC converters to operate the one or more loads, thereby leading to improved system efficiency of multiport USB based power adapter.

10 Claims, 5 Drawing Sheets

SYSTEM AND METHOD FOR IMPROVING EFFICIENCY IN MULTIPORT USB BASED POWER ADAPTERS

CROSS REFERENCE TO RELATED APPLICATION(S)

This application claims the benefit of and priority to India Application Serial No. 202141028407, entitled "SYSTEM AND METHOD FOR IMPROVING EFFICIENCY IN MULTIPORT USB BASED POWER ADAPTERS" and filed on Jun. 24, 2021, which is expressly incorporated by reference herein in its entirety.

TECHNICAL FIELD

The present disclosure relates, in general, to power converters, and more specifically, relates to a multiport USB based power adapter.

INTRODUCTION

Rechargeable portable electronic devices require an external power source to charge their batteries. Power adapters support different types of portable electronic devices/sink devices such as mobiles, personal digital assistant (PDA), notebook computers, monitors and the likes. The power adapters having an AC-DC power conversion stage followed by synchronous buck converters. AC power is typically supplied from wall outlets and the electronic devices include circuitry that runs from DC power. The DC power that is created by an AC-to-DC power converter may be used to power the electronic devices.

The AC-DC converter output is connected to each of the synchronous buck converter input. Each synchronous buck converter has a system controller integrated or external universal serial bus (USB) protocol controller. These AC-DC converter and buck converters can work independently. The Buck converter output voltage range is 3.3V to 21 VDC as per port partner i.e., sink device request.

Generally, the AC-DC power converter output voltage is fixed i.e., the typical value is 22-24 VDC. Typical mobile devices or handheld gadgets require a voltage of less than 10 VDC input. The synchronous buck converter in the power adapter converts the received higher voltage into lower voltage as requested by port partners. The synchronous buck converter power conversion efficiency is lower at higher input voltages and lower output voltages. Hence, these existing synchronous buck converters suffer from limitations of low efficiency as more heat is generated on the buck converter circuit and thereby requires a more complex thermal management system in the power adaptor to accommodate the heating and thermal effects generated in the adaptor. Further, it is expensive, and the overall power adaptor reliability is low due to component degradation at higher voltages and temperatures.

Therefore, there is a need in the art to provide a means that can dynamically adjust the AC-DC conversion to improve the efficiency of the power adaptor.

An object of the present disclosure relates, in general, to power converters, and more specifically, relates to a multi-port power adapter with USB ports.

Another object of the present disclosure dynamically adjusts the AC-DC converter output voltage to improve the efficiency of multiport power adapters.

Another object of the present disclosure provides the highest efficiency at all conditions of multiport power adaptor including no load, all connected and any combination of connected ports with combination of power profile requests.

Another object of the present disclosure reduces the requirement of a complex thermal management system in the multiport power adaptor.

Another object of the present disclosure improves the reliability of the multiport power adaptor.

Another object of the present disclosure dynamically adjusts AD-DC converter output voltage to improve the buck converter efficiency.

Another object of the present disclosure provides a power adapter that can deliver sufficient power to charge multiple portable electronic devices at a single time with high efficiency.

Another object of the present disclosure provides a power adapter that minimizes the difference between DC-DC converter input voltage and output voltages.

Yet another object of the present disclosure reduces the size and cost of the power adapter by improving the thermal design.

BRIEF SUMMARY

The present disclosure relates, in general, to power converters, and more specifically, relates to a multiport power adapter with USB ports. The present disclosure dynamically adjusts the AC-DC converter output voltage to improve the efficiency of the power adaptor through a constant current source and a system controller.

In an aspect, the present disclosure provides an apparatus for adjusting AC-DC converter output voltage, the apparatus includes a plurality of ports configured to supply power to corresponding one or more loads, an alternating current (AC)-direct current (DC) converter circuit converts AC power from an AC source to DC power, and a plurality of DC-DC converters coupled to a plurality of controllers, the plurality of controllers coupled to corresponding plurality of ports to operate the one or more loads, the plurality of controllers monitor events for connection/disconnection, new profile request from one or more loads and store respective port power profile, wherein at least one controller of the plurality of controllers is a master controller or a system controller communicates with plurality of controllers, AC-DC converter and plurality of DC-DC converter and the other plurality of controllers are slave controllers, the master controller or the system controller configured to determine, from the slave controllers, input signals pertaining to parameters of power levels for each port of the plurality of ports based on the one or more loads that are connected to the corresponding plurality of ports, the parameter pertaining to voltage, calculate, from the determined parameters, an optimal input voltage value for the plurality of DC-DC converters based on the determination of highest voltage requested on each port of the plurality of ports, the calculated required AC-DC output is equal to the highest voltage profile value plus the adjusted voltage (Vadj) which improves the efficiency for multiport power adapter and communicate the calculated value to the AC-DC converter circuit through a constant current source, the master controller reads the plurality of DC-DC converter input voltage through digital communication to adjust the constant current source output coupled to AC-DC converter feedback circuit through digital communication till the input voltage of the plurality of the DC-DC converter reaches the highest voltage profile value plus the adjusted voltage, wherein, in response to the calculated value, the AC-DC converter circuit regulate the amount of DC voltage that is being supplied to the plurality of DC-DC converters to operate the corresponding one or more loads.

According to an embodiment, the master controller determines the highest voltage requested by each port of the plurality of ports based on comparison of requested voltage value of each port of the plurality of ports.

According to an embodiment, the plurality of controllers is any or a combination of integrated USB protocol controller and external USB protocol controller.

According to an embodiment, the master controller or system controller communicates with each of the slave controllers and the constant current source through an interface to determine the requested voltage on power supplying line of each port of the plurality of ports and AC-DC output respectively.

According to an embodiment, the interface is general purpose input/output (GPIO), Inter-integrated circuit (I2C), or any digital communication, and a combination thereof.

According to an embodiment, the master controller communicates the calculated value to the constant current source through an interface, the constant current source pumps the pre-calculated current as requested by the master controller into the AC-DC feedback circuit to adjust the AD-DC output voltage, wherein the master controller can be any of the USB port controllers or separate system controller.

According to an embodiment, the constant current source pumps the current into the AC-DC feedback circuit which changes the sample of AC-DC internal PWM comparator related circuit to adjust the AC-DC output voltage.

According to an embodiment, the master controller communicates the calculated value with the AC-DC converter circuit through GPIO, I2C, pulse width modulation (PWM), any digital communication and a combination thereof.

According to an embodiment, the system level efficiency is the highest in all conditions including no load condition, all connected ports and any combination of connected ports with combination of power profile requests In an aspect, the present disclosure provides a method for adjusting AC-DC converter output voltage, the method includes monitoring, by a plurality of controllers, events for connection/disconnection, new profile request from one or more loads and store respective port power profile, the plurality of controllers coupled to corresponding plurality of ports to operate the one or more loads, at least one controller of the plurality of controllers is a master controller or a system controller with the ability to communicate with plurality of controllers, AC-DC converter and plurality of DC-DC converter and the other plurality of controllers are slave controllers, determining, at master controller or system controller input signals pertaining to parameters of power levels, from slave controllers, for each port of the plurality of ports based on one or more loads that are connected to corresponding plurality of ports, the parameter pertaining to voltage, calculating, at the master controller or the system controller, from the determined parameters, an optimal input voltage value for a plurality of DC-DC converters based on the highest requested voltage on each port of the plurality of ports, the plurality of DC-DC converters coupled to the plurality of controllers, the calculated required AC-DC output is equal to the highest voltage profile value plus the adjusted voltage (Vadj), which improves the efficiency for multiport power adapter; and communicating, at the master controller, the calculated value to AC-DC converter circuit through a constant current source, the master controller reads the plurality of DC-DC converter input voltage through digital communication to adjust the constant current source output coupled to AC-DC converter feedback circuit through digital communication till the input voltage of the plurality of the DC-DC converter reaches the highest voltage profile value plus the adjusted voltage. wherein, in response to the calculated value, the AC-DC converter circuit regulate the amount of DC voltage that is being supplied to the plurality of DC-DC converters to operate the corresponding one or more loads.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWINGS

The following drawings form part of the present specification and are included to further illustrate aspects of the present disclosure. The disclosure may be better understood by reference to the drawings in combination with the detailed description of the specific embodiments presented herein.

DETAILED DESCRIPTION

The following is a detailed description of embodiments of the disclosure depicted in the accompanying drawings. The embodiments are in such detail as to clearly communicate the disclosure. If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Figure 1:
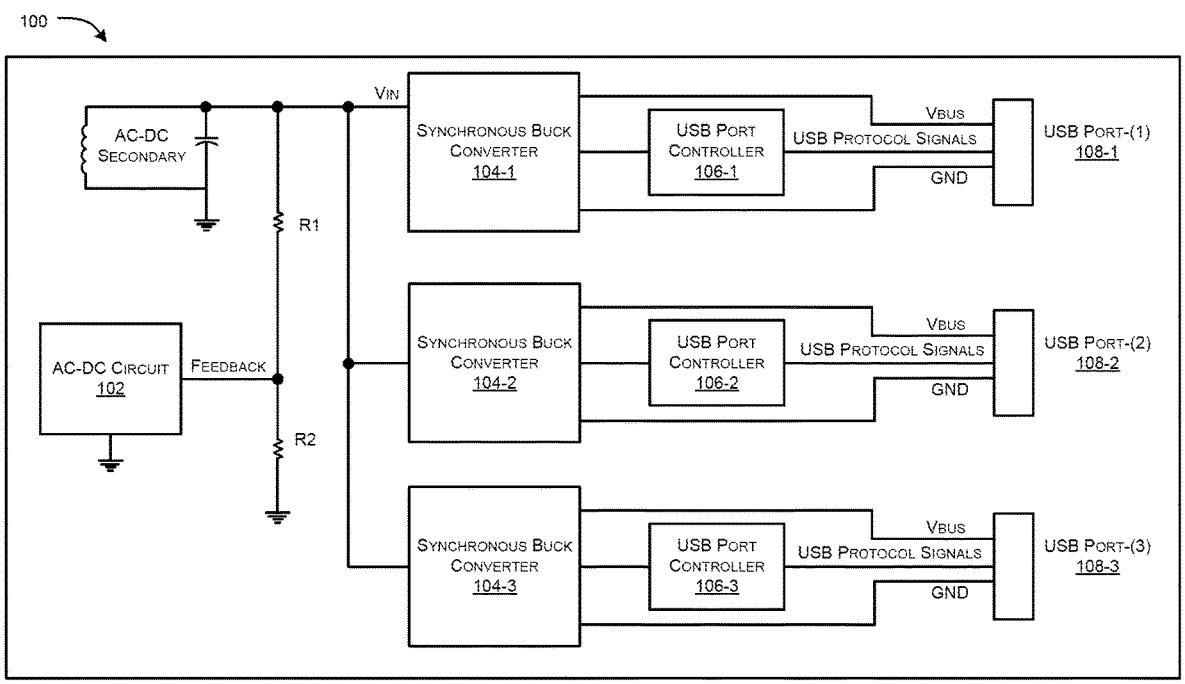
FIG. 1 illustrates an example three-port power adaptor in accordance with various aspect of the present disclosure.

FIG. 1 illustrates an example of a three-port power adaptor.

Referring to FIG. 1, the three-port power adaptor 100 may include an AC-DC circuit 102 for power conversion followed by two are more synchronous buck converters, where the reference image FIG. 1 shows three synchronous buck converters (104-1 to 104-3). The AC-DC converter output Vin is given to synchronous buck converters input as shown in FIG. 1. The buck converters (104-1 to 104-3) operatively coupled to system controllers or USB port controllers (106-1 to 106-3). The AC-DC converter output voltage is fixed i.e., typically 22-24V. The buck converters convert that Vin to 3.3V from 21V based on the request received on power delivery protocol on USB port or any other proprietary protocol on USB lines. The system controller processes the port partner requested power (voltage and/or current) and adjust the buck converter output voltage or current. The USB port controllers (106-1 to 106-3) connected to the USB ports (108-1 to 108-3) through configuration channel (CC) or/and data lines D+/D− signals for getting the power request from the port partner.

The existing buck converter may work at high input voltage (more than 20V) with low output voltage for handheld gadgets, such that it is operating at lower efficiency. The synchronous buck converter efficiency is lower at higher input voltage for such conversion. The existing buck converter suffers from limitations of low efficiency as more heat is generated on the synchronous buck converter circuit and thereby requires a more complex thermal management system in the power adaptor to accommodate the heating and thermal effects generated in the adaptor. Further, it is expensive, and the overall power adaptor reliability is low due to component degradation at higher voltages and temperatures.

The present disclosure relates, in general, to power converters, and more specifically, relates to a multiport USB based power adapter. The present disclosure enables a power adapter to dynamically adjusts the AC-DC converter output voltage to improve the efficiency of the power adaptor. The present disclosure can be described in enabling detail in the following examples, which may represent more than one embodiment of the present disclosure.

Figure 2A:
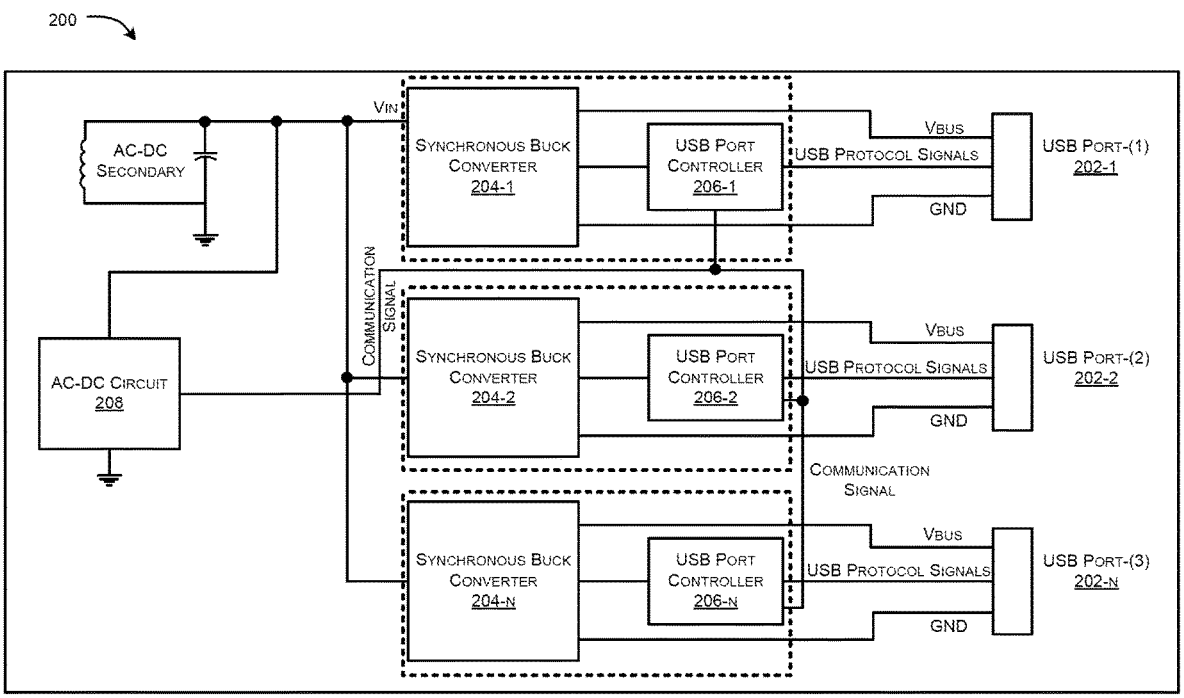
FIG. 2A illustrates an exemplary representation of a multiport power adaptor using direct digital communication method, in accordance with an embodiment of the present disclosure.

FIG. 2A illustrates an exemplary representation of a multiport power adaptor using direct digital communication method, in accordance with an embodiment of the present disclosure.

Referring to FIG. 2A, power adapter 200 (also referred to as an apparatus 200, herein) of a system can be configured to determine optimal input voltage value for DC-DC converters. The DC power that is produced by the power adapter 200 can be used to power portable electronic devices. The present disclosure dynamically adjusts AD-DC converter output voltage to improve the buck converter efficiency. The power adapter 200 can be operated using the direct digital communication method shown in FIG. 2A. The power adapter 200 can also be operated using a constant current source method as illustrated and described in FIG. 2B, when the AD-DC converter is not supported by the direct digital communication method.

In an exemplary embodiment, the power adapter 200 as illustrated in an example may be a multiport power adapter with n-port configuration. As can be appreciated, the present disclosure may not be limited to this configuration but may be extended to other configurations such as two ports power adapter and the likes. In an embodiment, the power adapter 200 can include two or more universal serial bus (USB) ports (202-1 to 202-N (which are collectively referred to as ports 202, herein)), two or more DC-DC converters (204-1 to 204-N (which are collectively referred to as DC-DC converters 204, herein)), AC-DC converter circuit 208, and two or more USB port controllers (206-1 to 206-N), where the USB port controllers (206-1 to 206-N) can be internal or external of the buck convertors 204. The power adapter 200 also interchangeably referred to as multiport USB, where the multiport USB can be Type-A, Type-B, Micro-B, Mini B, Type-C and any combination thereof.

The power adapter 200 is adapted to charge portable electronic devices also interchangeably referred to as one or more loads/sink devices connected to ports (202-1 to 202-N), where the portable electronic devices can include mobile phones, handheld gadgets, laptop, notebook computers, monitors, personal digital assistant (PDA) and the likes. The USB ports 202 may include configuration channel (CC) (only on Type-C), data lines (D+, D−), a power supplying line (Vbus), and a ground line (GND).

In an embodiment, the DC-to-DC converter 204 also interchangeably referred to as synchronous buck converters 204 configured in the power adapter 200, the DC-to-DC converter 204 is an electronic circuit that converts a source of DC from one voltage level to another voltage level to meet the demand of the portable electronic devices, which may operate at different voltages. Each of the buck converters 204 has an integrated or external USB port controller/controllers, each of the controller 206 coupled to corresponding USB ports 202.

Figure 2B:
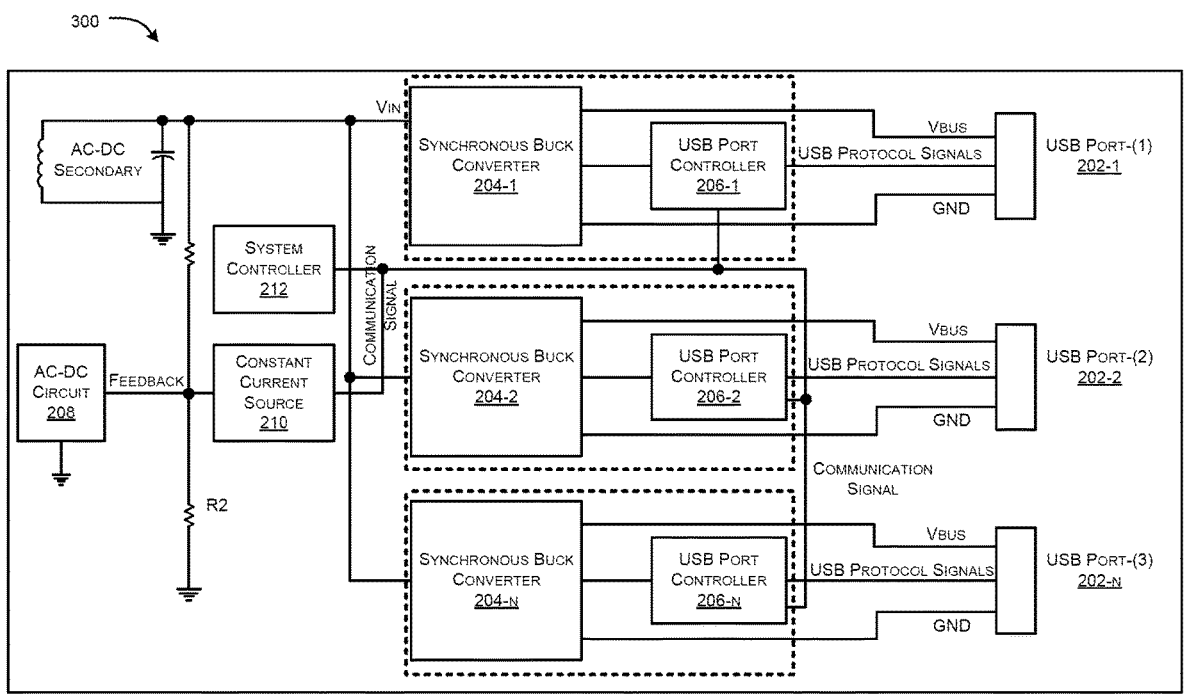
FIG. 2B illustrates an exemplary representation of a multiport power adaptor with constant current source and which may have an external system controller, in accordance with an embodiment of the present disclosure.

In an exemplary embodiment, at least one controller of the two or more controllers (206-1 to 206-N) may be configured as a master controller also interchangeably referred to as system controller 212, where separate system controller 212 (also referred to as an external controller (as illustrated in FIG. 2B)) may be configured as a master controller that can communicate with the two or more controllers (206-1 to 206-N), AC-DC converter 208 and the DC-DC converter 204 and the other controllers of the two or more controllers (206-1 to 206-N) may be configured as slave controllers. The controllers (206-1 to 206-N) can be any or a combination of integrated USB protocol controller or external USB protocol controller. Any system controller 212 can be configured as a master. For example, the controller 206-1 as shown in FIG. 2A can be configured as a master controller and controllers (206-2 to 206-N) can be configured as slave controllers. The master controller 206-1 may include microprocessors, digital signal processors, microcontrollers, memory circuits, hardwired processing circuits, communications circuits and the likes. The controllers monitor events for connection/disconnection and new profile request from one or more loads and store respective port power profile.

The master controller 206-1 periodically checks the power requested by each of the ports 202 by interacting with the slave controllers (206-2 to 206-N) through any suitable standard interface. Alternatively, the slave controllers (206-2 to 206-N) may generate an alert based on the change in power demand of the ports 202 coupled to corresponding loads.

The master controller 206-1 or the system controller 212 can determine, from the slave controllers (206-2 to 206-N), input signals pertaining to parameters of power levels for each port 202 based on the loads that are connected to the corresponding ports 202, the parameter pertaining to voltage. The master controller 206-1 calculates, from the determined parameter, an optimal input voltage value for the DC-DC converters 204 based on the highest voltage requested by each port 202.

If the AC-DC converter 208 has any digital interface. The master controller 206-1 can directly communicate the calculated value to the AC-DC converter 208 through digital interface to adjust the required calculated DC-input voltage to the DC-DC converters 204. In response to the calculated value, the AC-DC converter circuit 208 regulate the amount of DC voltage that is being supplied from the output path of AC-DC converter circuit 208 to the DC-DC converters 204 to operate the corresponding one or more loads.

The master controller 206-1 directly communicates the calculated value to the AC-DC converter 208 through general-purpose input/output (GPIO), inter-integrated circuit (I2C), pulse width modulation (PWM), any digital communication and a combination thereof which is accepted by AC-DC circuit as shown in FIG. 2A to adjust the AC-DC output voltage as per the calculated value.

The system controller 212 may be implemented as one or more microprocessors, microcomputers, microcontrollers, digital signal processors, central processing units, logic circuitries, and/or any devices that manipulate data based on operational instructions. Among other capabilities, the one or more processor(s) are configured to fetch and execute computer-readable instructions stored in a memory. The memory may store one or more computer-readable instructions or routines, which may be fetched and executed to create or share the data units. The memory may comprise any non-transitory storage device including, for example, volatile memory such as random-access memory (RAM), or non-volatile memory such as erasable programmable read-only memory (EPROM), flash memory, and the like. The system controller can include interface that may also provide a communication pathway between the components.

FIG. 2B illustrates an exemplary representation of a multiport power adaptor with constant current source and which may have an external system controller, in accordance with an embodiment of the present disclosure.

Referring to FIG. 2B, power adapter 200 can include two or more USB ports 202, DC-DC converters 204, two or more USB port controllers (206-1 to 206-N), AC-DC converter circuit 208 and a constant current source 210. The AC-DC converter circuit 208 may convert AC power from an AC source to DC power on the output paths. In the present disclosure, the output voltage of the AC-DC converter circuit 208 is controlled by controlling the AC-DC secondary. The AC-DC converter circuit 208 may contain feedback control circuitry (also referred to as analogue feedback circuit) for controlling internal PWM comparator related circuits to regulate the production of DC power from the AC source. The analogue feedback circuit can adjust the output voltage.

The control circuitry may be responsive to feedback signals. In response to the feedback information, the control circuitry in AC-DC converter circuit 208 can make real-time adjustments to the amount of DC voltage that is being supplied to the output path of AC-DC converter circuit 208. The constant current source 210 interacts with the AC-DC secondary feedback path to regulate the amount of DC power. The constant current source 210 pumps the current into AC-DC feedback circuit (R1 and R2 path), which can change the sample of AC-DC internal PWM comparator related circuit to adjust the AC-DC output voltage.

The controller 206-1 as shown in FIG. 2B may be configured as a master controller and controllers (206-2 to 206-N) can be configured as slave controllers. The controllers (206-1 to 206-N) can be any or a combination of integrated USB protocol controller or external USB protocol controller. Any system controller 212 can be configured as a master. Alternatively, the system controller 212 may be configured as the master controller that can communicate with the two or more controllers (206-1 to 206-N), AC-DC converter 208 and the DC-DC converter 204 The controllers monitor events for connection/disconnection and new profile request from one or more loads/sink devices and store respective port power profile. The master controller 206-1 or the separate system controller 212 can determine, from the slave controllers (206-2 to 206-N), input signals pertaining to parameters of power levels for each port 202 based on the loads that are connected to the corresponding ports 202, the parameter pertaining to voltage.

The master controller 206-1 calculates, from the determined parameters, an optimal input voltage value for the DC-DC converters 204 based on the highest voltage requested by each port 202. The calculated required AC-DC output is equal to the highest voltage profile value plus the adjusted voltage (Vadj), which improves the efficiency for multiport power adapter. The master controller 206-1 communicates the calculated value to the AC-DC converter circuit 208 through the constant current source 210. The master controller 206-1 reads the buck converters/DC-DC converters 204 input voltage through digital communication, adjust the constant current source output coupled to the AC DC converter feedback path/circuit through digital communication till the input voltage of the buck converters 204 reach the highest voltage profile value plus the adjusted voltage (Vadj). In response to the calculated value, the AC-DC converter circuit 208 regulate the amount of DC voltage that is being supplied from the output path of AC-DC converter circuit 208 to the DC-DC converters 204 to operate the corresponding one or more loads.

For example, the master USB port controller 206-1 determines the required voltage of each of the USB ports coupled with any portable electronic devices to calculate the optimal input voltage value of the buck converters 204. The master USB port controller 206-1 communicates the optimal input voltage value of the buck converters 204 to the constant current source 210. The constant current source pumps the current into AC-DC converter feedback path as shown in FIG. 2B, to adjust the AC-DC converter output to calculated optimal voltage value. Thereby, the difference in output voltages of the AC-DC converter circuit and buck converters output can be minimized for achieving improved efficiency of the power adapter 200.

The master controller 206-1 interacts with each of the slave USB port controllers (206-2 to 206-N) dynamically, through GPIO, I2C, any digital communication and a combination thereof to determine the requested voltage on the Vbus line of each of the USB ports 202, where the DC voltage level is referred to as Vbus. Based on the highest Vbus voltage on each of the USB ports 202, the master controller 206-1 calculates the optimal input voltage value for the buck converters 204. The master controller 206-1 or system controller 212 communicates with each of the slave controllers (206-2 to 206-N) and constant current source through the interface to determine the requested voltage on power supplying line of each port and AC-DC output, respectively.

For example, the power adapter may have three USB ports. If a user desires to power three devices simultaneously, a first device may be powered using a first of the USB ports on the power adapter, a second device may be powered using a second of the USB ports and a third device may be powered using a third of the USB ports. The power adapter must have the capacity to satisfy the power demands of the three devices that are connected to the corresponding ports. The master controller interacts with the slave controllers to determine the required output voltage of port 1, port 2 and port 3 to calculate the optimal input voltage value of the buck converters 204. The optimal input voltage value is calculated by determining the maximum voltage requested by each of the three devices connected to corresponding ports. The master controller communicates the calculated value to the constant current source. The current source pumps the pre-calculated current, as requested by the master controller, into the AC-DC feedback path to adjust the AC-DC output voltage. In another embodiment, the method can be operated for single port, as they request single voltage and Vin to DC-DC converter can always be changed to Vin=Vout+Vadj.

The embodiments of the present disclosure described above provide several advantages. The one or more of the embodiments of the present disclosure provides the power adapter that dynamically adjusts the AC-DC converter output voltage to improve efficiency. The present disclosure reduces the requirement of the complex thermal management system in the multiport power adaptor and improves the reliability of the multiport power adaptor. The power adapter 200 dynamically adjusts AD-DC converter output voltage to improve the buck converter efficiency and can deliver sufficient power to charge multiple portable electronic devices at a single time with high efficiency. The proposed new method minimizes the difference between DC-DC converter input voltage and output voltages. The present disclosure provides the highest efficiency at all conditions of multiport power adaptor including no load, all connected and any combination of connected with combination of power profile requests. Further, the size and cost of the power adapter are reduced by improving the thermal design.

Figure 3:
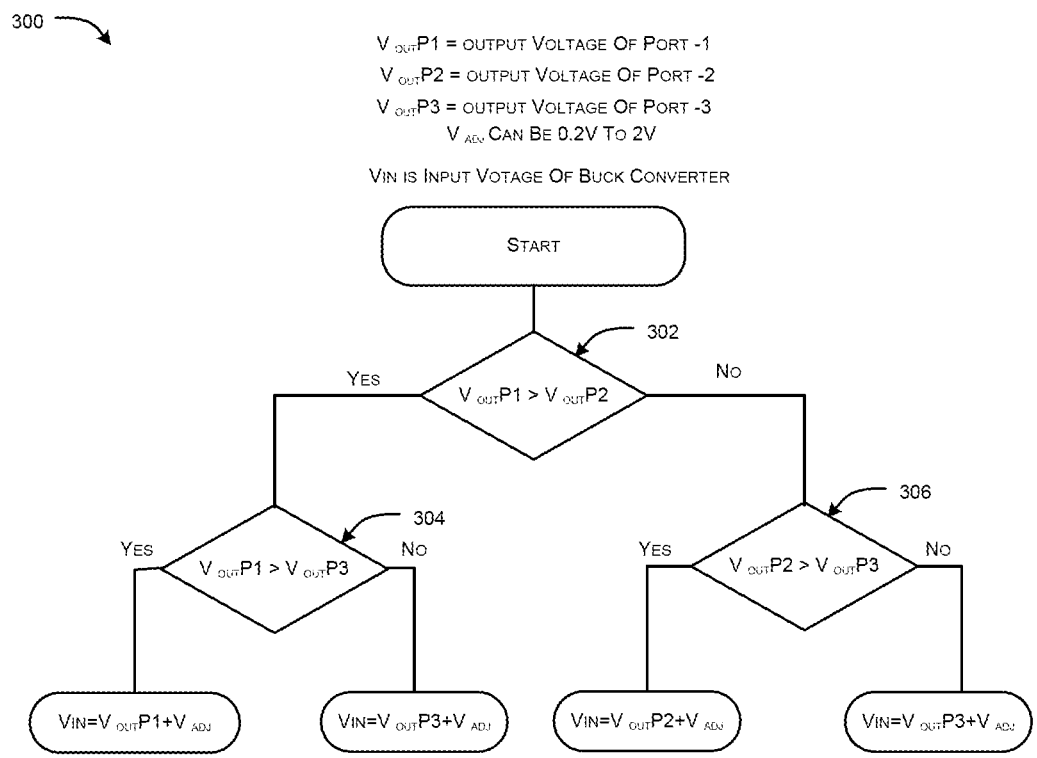
FIG. 3 is a high-level flow diagram illustrating a method for calculating optimal input voltage of buck converter, in accordance with an embodiment of the present disclosure.

FIG. 3 is a high-level flow diagram illustrating a method for calculating optimal input voltage of buck converter, in accordance with an embodiment of the present disclosure.

The Vout mentioned in FIG. 3 refers to the Vbus input to the corresponding USB port i.e., Vout of the corresponding buck converter. The Vbus voltages to different ports are referred to as VoutPn, where n can be any port.

For example, VoutP1 refers to the Vbus voltage at USB Port1. The algorithm mentioned can be scaled to n-port power adapter. Vin is the input supply to the synchronous DC-DC converters for each of the USB ports.

At block 302, the master controller 206-1 determines the required output voltage voutP1 of USB port 1 and compares it with the other ports. If the output voltage voutP1 of USB port 1 is greater than the required output voltage voutP2 of USB port 2, it moves to block 304, else it goes to block 306.

At block 304, the master controller 206-1 determines if the output voltage voutP1 of USB port 1 is greater than the required output voltage voutP3 of USB port 3, the input voltage Vin of the buck converter 204 is equal to the sum of the maximum required output voltage of USB port P1 and the adjusted voltage Vadj. Similarly, if the output voltage voutP1 of USB port 1 is lesser than the output voltage voutP3 of USB port 3, the input voltage Vin of the buck converter 204 is equal to the sum of the maximum required output voltage of USB port P3 and the adjusted voltage Vadj.

At block 306, the master controller 206-1 determines if the required output voltage voutP2 of USB port 2 is greater than the required output voltage voutP3 of USB port 3, the input voltage Vin of the buck converter 204 is equal to the sum of the maximum required output voltage of USB port P2 and the adjusted voltage Vadj. Similarly, if the output voltage voutP2 of USB port 2 is lesser than the output voltage voutP3 of USB port 3, the input voltage Vin of the buck converter 204 is equal to the sum of the maximum required output voltage of USB port P3 and the adjusted voltage Vadj.

Thus, the master controller 206-1 determines the highest voltage requested by each port 202 based on comparison of requested power value of each port 202.

Figure 4:
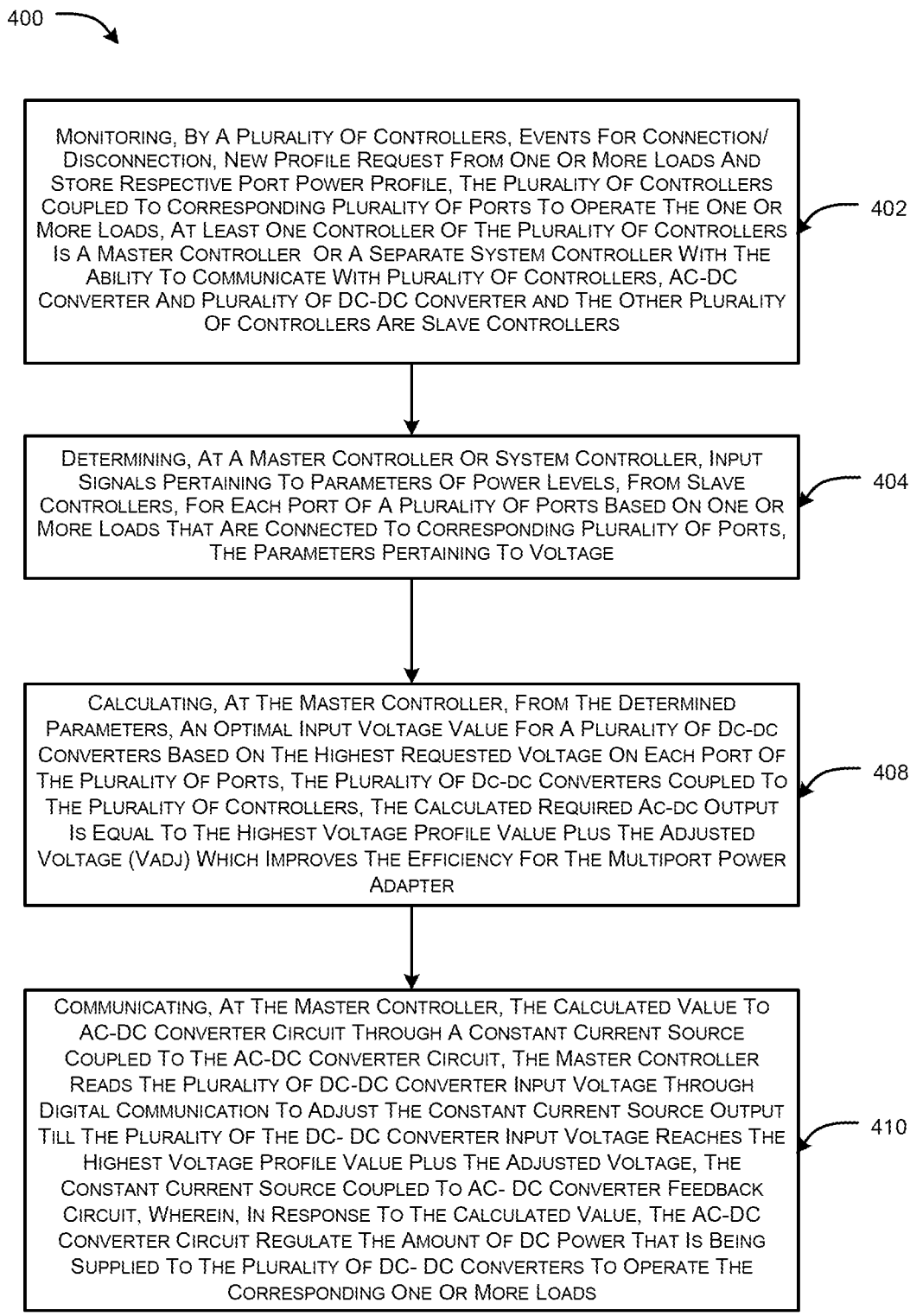
FIG. 4 illustrates an exemplary flow diagram of a method for regulating AC to DC conversion, in accordance with an embodiment of the present disclosure.

FIG. 4 illustrates an exemplary flow diagram of a method 400 for adjusting AC-DC converter output voltage, in accordance with an embodiment of the present disclosure.

Referring to FIG. 4, at block 402, the plurality of controllers monitors events for connection/disconnection and new profile request from one or more loads and store respective port power profile, the plurality of controllers coupled to corresponding plurality of ports to operate the one or more loads, at least one controller of the plurality of controllers is the master controller or a system controller 212 with the ability to communicate with plurality of controllers, AC-DC converter and plurality of DC-DC converter and the other plurality of controllers are the slave controllers.

At block 404, the master controller 206-1 or system controller 212 can determine input signals pertaining to parameters of power levels (voltage and current), from slave controllers (206-2 to 206-N), for each port of the plurality of ports 202 based on the one or more loads that are connected to the corresponding plurality of ports, the parameter pertaining to voltage. A plurality of DC-DC converters 204 coupled to a plurality of controllers (206-1 to 206-N), At block 406, the master controller 206-1 can calculate from the determined parameters, an optimal input voltage value for the plurality of DC-DC converters 204 based on the highest voltage requested by each port 202 of the plurality of ports. The calculated required AC-DC output is equal to the highest voltage profile value plus the adjusted voltage (Vadj), which improves the efficiency for the multiport power adapter.

At block 408, the master controller can communicate the calculated value to AC-DC converter circuit 208 through a constant current source 210. The master controller reads the plurality of DC-DC converter input voltage through digital communication to adjust the constant current source output coupled to AC-DC converter feedback circuit through digital communication till the input voltage of the plurality of the DC-DC converter reaches the highest voltage profile value plus the adjusted voltage. In response to the calculate value, the AC-DC converter circuit 208 regulate the amount of DC voltage that is being supplied to the plurality of DC-DC converters 204 to operate the corresponding one or more loads.

It will be apparent to those skilled in the art that the power adapter 200 of the disclosure may be provided using some or all of the mentioned features and components without departing from the scope of the present disclosure. While various embodiments of the present disclosure have been illustrated and described herein, it will be clear that the disclosure is not limited to these embodiments only. Numerous modifications, changes, variations, substitutions, and equivalents will be apparent to those skilled in the art, without departing from the scope of the disclosure, as described in the claims.

The present disclosure dynamically adjusts the AC-DC converter output voltage to improve the efficiency of multiport power adapters.

The present disclosure reduces the requirement of a complex thermal management system in the multiport power adaptor.

The present disclosure provides the highest efficiency at all conditions of multiport power adaptor including no load, all connected and any combination of connected ports with combination of power profile requests.

The present disclosure improves the reliability of the multiport power adaptor.

The present disclosure dynamically adjusts AD-DC converter output voltage to improve the buck converter efficiency.

The present disclosure provides a power adapter that can deliver sufficient power to charge multiple portable electronic devices at a single time with high efficiency.

The present disclosure reduces the size and cost of the power adapter by improving the thermal design.

The present disclosure provides a power adapter that minimizes the difference between DC-DC converter input voltage and output voltages.

We claim:

1. An apparatus for adjusting alternating current (AC)-direct current (DC) (AC-DC) converter output voltage, said apparatus comprising:
    a plurality of ports configured to supply power to corresponding one or more loads;
    an AC-DC converter circuit that converts AC power from an AC source to DC power;
    a plurality of DC-DC converters coupled to a plurality of controllers;
    a constant current source coupled to the AC-DC converter circuit and the plurality of controllers; and
    a system controller that only communicates with the plurality of controllers and the constant current source,
    wherein the plurality of controllers are coupled to corresponding plurality of ports to operate the one or more loads, the plurality of controllers monitor events for connection/disconnection, new profile request from the one or more loads and store respective port power profile,
    wherein at least one controller of the plurality of controllers is a master controller or the system controller that communicates with the plurality of controllers, the AC-DC converter and the plurality of DC-DC converters, other plurality of controllers are slave controllers, the master controller or the system controller is configured to:
        determine, from said slave controllers, input signals pertaining to parameters of power levels for each port of the plurality of ports based on the one or more loads that are connected to the corresponding plurality of ports, the power levels including current and voltage;
        calculate, from the parameters determined, an optimal input voltage value for the plurality of DC-DC converters based on a highest voltage requested by one or more ports of the plurality of ports, the optimal input voltage is equal to the highest voltage requested plus an adjusted voltage; and
        communicate the optimal input voltage to said AC-DC converter circuit through the constant current source, the master controller reads the plurality of DC-DC converters input voltage through digital communication to adjust the constant current source output coupled to AC-DC converter feedback circuit through digital communication till the input voltage of the plurality of the DC-DC converter reaches the optimal input voltage,
    wherein, in response to the optimal input voltage, the AC-DC converter circuit regulates DC voltage that is being supplied to the plurality of DC-DC converters to operate the corresponding one or more loads, and
    wherein the constant current source is directly connected to the system controller and each controller of the plurality of controllers.

2. The apparatus as claimed in claim 1, wherein the master controller determines the highest voltage requested by the one or more ports of the plurality of ports based on comparison of requested voltage value of each port of the plurality of ports.

3. The apparatus as claimed in claim 1, wherein said plurality of controllers is any or a combination of integrated Universal Serial Bus (USB) protocol controller and external USB protocol controller.

4. The apparatus as claimed in claim 1, wherein the master controller or the system controller communicates with each of the slave controllers and constant current source through an interface to determine requested voltage on power supplying line of each port of the plurality of ports and AC-DC output respectively.

5. The apparatus as claimed in claim 4, wherein said interface is a general purpose input/output (GPIO), an inter-integrated circuit (I2C), a digital communication, or a combination thereof.

6. The apparatus as claimed in claim 1, wherein said master controller communicates the optimal input voltage to the constant current source through an interface, the constant current source pumps pre-calculated current as requested by the master controller into an AC-DC feedback circuit to adjust AC-DC output voltage.

7. The apparatus as claimed in claim 6, wherein said constant current source pumps the current into the AC-DC feedback circuit to change sample of AC-DC internal pulse width modulation (PWM) comparator related circuit to adjust the AC-DC output voltage.

8. The apparatus as claimed in claim 1, wherein the master controller communicates the optimal input voltage with the AC-DC converter circuit through the constant current source.

9. The apparatus as claimed in claim 1, wherein the optimal input voltage is configured to improve an efficiency level of the apparatus in all conditions of multiport power adaptor including no load condition, all connected ports, and any combination of the connected ports with combination of power profile requests.

10. A method for adjusting alternating current (AC)-direct current (DC) (AC-DC) converter output voltage, the method comprising:
    monitoring, by a plurality of controllers, a system controller that communicates with the plurality of controllers, and a constant current source, events for connection/disconnection, new profile request from one or more loads and storing respective port power profile, the plurality of controllers coupled to a corresponding plurality of ports to operate the one or more loads, at least one controller of the plurality of controllers is a master controller, an AC-DC converter, and a plurality of DC-DC converters, other plurality of controllers being slave controllers, the constant current source being coupled to the AC-DC converter and the plurality of controllers, and the system controller only communicates with the plurality of controllers and the constant current source;
    determining, at the master controller or the system controller, input signals pertaining to parameters of power levels, from the slave controllers, for each port of the corresponding plurality of ports based on the one or more loads that are connected to the corresponding plurality of ports, the power levels including current and voltage;
    calculating, at the master controller, based on the parameters, an optimal input voltage value for the plurality of DC-DC converters based on a highest requested voltage by one or more ports of the plurality of ports, the plurality of DC-DC converters coupled to the plurality of controllers, an optimal input voltage is equal to the highest request voltage plus the adjusted voltage; and
    communicating, by the master controller, the optimal input voltage to the AC-DC converter through the constant current source, the master controller reads input voltage of the plurality of DC-DC converters through digital communication to adjust the constant current source output coupled to an AC-DC converter feedback circuit through the digital communication till the input voltage of the plurality of the DC-DC converters reaches the optimal input voltage, wherein, in response to the optimal input voltage, the AC-DC converter regulates an amount of DC voltage that is being supplied to the plurality of DC-DC converters to operate the one or more loads, and wherein the constant current source is directly connected to the system controller and each controller of the plurality of controllers.

\* \* \* \* \*

UNITED STATES PATENT AND TRADEMARK OFFICE
CERTIFICATE OF CORRECTION

PATENT NO. : 11,936,282 B2
APPLICATION NO. : 17/700399
DATED : March 19, 2024
INVENTOR(S) : Burle Naga Satyanarayana, Shubham Paliwal and Rakesh Kumar Polasa It is certified that error appears in the above-identified patent and that said Letters Patent is hereby corrected as shown below:

On the Title Page

Item (72) In the "Inventors" section, 2nd and 4th line delete "Kumar", therefor.

Signed and Sealed this
Thirtieth Day of April, 2024

Katherine Kelly Vidal
*Director of the United States Patent and Trademark Office*